(12) United States Patent
Abbott, Jr. et al.

(10) Patent No.: US 10,669,195 B2
(45) Date of Patent: Jun. 2, 2020

(54) APPARATUSES AND METHODS FOR HOLDING, RETAINING, AND/OR PROCESSING GLASSWARE ARTICLES

(71) Applicant: CORNING INCORPORATED, Corning, NY (US)

(72) Inventors: John Steele Abbott, Jr., Painted Post, NY (US); Kevin Robert Kaelin, Pine City, NY (US); Peter Knowles, Elmira, NY (US); Brent Charles Schuld, Elmira, NY (US); Christopher Lee Timmons, Big Flats, NY (US)

(73) Assignee: CORNING INCORPORATED, Corning, NY (US)

( * ) Notice: Subject to any disclaimer, the term of this patent is extended or adjusted under 35 U.S.C. 154(b) by 107 days.

(21) Appl. No.: 16/102,181

(22) Filed: Aug. 13, 2018

(65) Prior Publication Data
US 2018/0346377 A1 Dec. 6, 2018

Related U.S. Application Data

(62) Division of application No. 15/151,168, filed on May 10, 2016, now abandoned.
(Continued)

(51) Int. Cl.
*C03C 21/00* (2006.01)
*B08B 9/42* (2006.01)
*B08B 11/02* (2006.01)

(52) U.S. Cl.
CPC .............. *C03C 21/002* (2013.01); *B08B 9/42* (2013.01); *B08B 11/02* (2013.01)

(58) Field of Classification Search
CPC .... C03C 21/00–008; B65D 1/38; B65D 1/16; B01L 9/06
See application file for complete search history.

(56) References Cited

U.S. PATENT DOCUMENTS

| 355,997 A | 1/1887 | Joyce |
|---|---|---|
| 390,735 A | 10/1888 | Wieland |

(Continued)

FOREIGN PATENT DOCUMENTS

| CN | 2933623 Y | 8/2007 |
|---|---|---|
| CN | 201641040 U | 11/2010 |

(Continued)

OTHER PUBLICATIONS

English translation of Russian 1st Office Action and Search Report dated Jan. 24, 2019, for RU Patent Application No. 2017107529. pp. 1-13.

(Continued)

*Primary Examiner* — Jason L Lazorcik
(74) *Attorney, Agent, or Firm* — Dinsmore & Shohl LLP

(57) ABSTRACT

According to embodiments disclosed herein, an apparatus may hold and retain glass articles during processing. The apparatus may define a plurality of receiving volumes for holding glass articles. The apparatus may include a bottom support floor, a glassware-securing member positioned above the bottom support floor, and a cover plate positioned above the glassware-securing member. The bottom support floor may include a plurality of fluid passages, the glassware-securing member may include a plurality of glassware-retaining openings, and the cover plate may include a plurality of fluid passages. Methods for the use of such apparatuses are also disclosed herein.

20 Claims, 10 Drawing Sheets

Related U.S. Application Data

(60) Provisional application No. 62/159,653, filed on May 11, 2015.

(56) References Cited

U.S. PATENT DOCUMENTS

| | | | |
|---|---|---|---|
| 431,862 A | 7/1890 | Abrams | |
| 463,604 A | 11/1891 | Iske | |
| 492,143 A | 2/1893 | Corley | |
| 659,328 A | 10/1900 | Strauss | |
| 664,475 A | 12/1900 | Graves | |
| 827,649 A | 7/1906 | Murphy | |
| 837,224 A | 11/1906 | Holcomb | |
| 898,007 A | 9/1908 | Rowe | |
| 1,079,789 A | 11/1913 | Merker | |
| 1,117,824 A | 11/1914 | Fleming | |
| 1,264,677 A | 4/1918 | Murrell | |
| 1,704,472 A | 3/1929 | Grandjean | |
| 1,744,054 A | 1/1930 | Mosgrove | |
| 1,798,779 A | 3/1931 | Bowersock | |
| 1,800,713 A | 4/1931 | Bowersock | |
| 1,828,837 A | 10/1931 | Gagen | |
| 1,980,930 A | 11/1934 | Reyniers | |
| 2,013,240 A | 3/1935 | Harvey | |
| 2,151,192 A | 3/1939 | Crosser | |
| 2,191,488 A | 2/1940 | McCowan | |
| 2,206,686 A | 7/1940 | Bauman | |
| 2,256,663 A | 9/1941 | Brewer | |
| 2,269,940 A | 1/1942 | Johnson | |
| 2,334,839 A | 11/1943 | Purchas | |
| 2,520,818 A | 8/1950 | Terry | |
| 2,545,416 A | 3/1951 | Staaf | |
| 2,615,749 A | 10/1952 | Kuchel | |
| 2,760,647 A | 8/1956 | Saul, Jr. | |
| 2,802,649 A | 8/1957 | Stockton | |
| 2,805,777 A | 9/1957 | Larson | |
| 2,945,583 A | 7/1959 | Sire | |
| 2,916,156 A | 12/1959 | Larson | |
| 2,956,686 A | 10/1960 | Garey | |
| 2,979,246 A | 4/1961 | Liebeskind | |
| 3,187,902 A | 6/1965 | Nelson | |
| 3,370,696 A | 2/1968 | Groe | |
| 3,379,315 A * | 4/1968 | Broadwin | B01L 9/543 |
| | | | 211/72 |
| 3,590,752 A | 7/1971 | De Pew | |
| 3,590,863 A | 7/1971 | Faust et al. | |
| 3,613,897 A | 10/1971 | Filler | |
| 3,643,812 A * | 2/1972 | Mander | B01L 9/06 |
| | | | 211/74 |
| 3,765,635 A | 10/1973 | Burrell et al. | |
| 3,768,709 A | 10/1973 | Kinard | |
| 3,780,972 A | 12/1973 | Brodersen | |
| 3,837,477 A | 9/1974 | Boudreau | |
| 4,040,234 A | 8/1977 | Stockdale et al. | |
| 4,068,798 A | 1/1978 | Rohde | |
| 4,182,455 A | 1/1980 | Zurawin | |
| 4,241,546 A | 12/1980 | Ilk | |
| 4,284,603 A * | 8/1981 | Korom | B01L 9/06 |
| | | | 210/323.1 |
| 4,285,449 A | 8/1981 | Campos | |
| 4,350,253 A | 9/1982 | Rusteberg | |
| 4,371,087 A | 2/1983 | Saujet | |
| 4,485,929 A | 12/1984 | Betts, Sr. | |
| 4,495,150 A * | 1/1985 | Cook | B01L 9/06 |
| | | | 422/527 |
| 4,498,594 A | 2/1985 | Elder | |
| 4,534,465 A | 8/1985 | Rothermel et al. | |
| 4,583,647 A | 4/1986 | Schinzing | |
| 4,681,233 A | 7/1987 | Roth | |
| 4,793,548 A | 12/1988 | Ross | |
| 4,871,074 A | 10/1989 | Bryson et al. | |
| 4,963,493 A * | 10/1990 | Daftsios | B01D 11/04 |
| | | | 206/569 |
| 5,036,989 A | 8/1991 | Carilli | |
| 5,148,919 A | 9/1992 | Rubin | |
| 5,169,603 A * | 12/1992 | Landsberger | B01L 9/06 |
| | | | 211/74 |
| 5,279,428 A | 1/1994 | Lee | |
| 5,346,063 A | 9/1994 | Chow | |
| 5,360,309 A | 11/1994 | Ishiguro | |
| 5,375,716 A | 12/1994 | Rubin et al. | |
| 5,384,103 A | 1/1995 | Miller | |
| 5,451,380 A | 9/1995 | Zinnanti | |
| 5,492,671 A | 2/1996 | Krafft | |
| 5,505,316 A | 4/1996 | Lee | |
| 5,544,747 A | 8/1996 | Horn | |
| 5,558,246 A | 9/1996 | Ross, Jr. | |
| 5,570,863 A | 11/1996 | Cooper | |
| 5,624,032 A | 4/1997 | Yucknut et al. | |
| 5,785,239 A | 7/1998 | Campbell, II et al. | |
| 5,797,675 A | 8/1998 | Tanner, Jr. | |
| 5,843,388 A | 12/1998 | Arroyo et al. | |
| 5,888,830 A | 3/1999 | Mohan et al. | |
| 5,893,457 A | 4/1999 | Wei | |
| 5,918,751 A | 7/1999 | Kelly | |
| 5,967,340 A | 10/1999 | Kao | |
| 5,984,293 A | 11/1999 | Abrahamson et al. | |
| 5,988,382 A | 11/1999 | Ritchie et al. | |
| 5,996,818 A * | 12/1999 | Boje | B01L 9/06 |
| | | | 206/443 |
| 6,113,202 A | 9/2000 | Germano | |
| 6,132,684 A * | 10/2000 | Marino | B01L 9/06 |
| | | | 211/74 |
| 6,193,064 B1 * | 2/2001 | Finneran | B01L 3/5085 |
| | | | 134/166 R |
| 6,193,081 B1 | 2/2001 | Ewing | |
| 6,227,370 B1 | 5/2001 | Eamshaw et al. | |
| 6,230,888 B1 | 5/2001 | Frieze et al. | |
| 6,244,447 B1 | 6/2001 | Frieze et al. | |
| 6,257,409 B1 | 7/2001 | Lin | |
| 6,274,092 B1 | 8/2001 | Itoh | |
| 6,279,760 B1 | 8/2001 | Broeski | |
| 6,290,680 B1 | 9/2001 | Forsberg et al. | |
| 6,299,000 B1 | 10/2001 | Cabrera | |
| 6,343,690 B1 | 2/2002 | Britton et al. | |
| 6,345,723 B1 | 2/2002 | Blake et al. | |
| 6,354,543 B1 | 3/2002 | Paske | |
| 6,382,685 B1 | 5/2002 | Hammond | |
| 6,443,316 B1 | 9/2002 | Mao | |
| 6,481,583 B1 | 11/2002 | Black et al. | |
| 6,533,133 B2 * | 3/2003 | Liu | B01L 9/06 |
| | | | 211/74 |
| 6,568,544 B1 * | 5/2003 | Lafond | B01L 9/06 |
| | | | 211/74 |
| 6,575,311 B1 | 6/2003 | Fink | |
| 6,640,981 B2 * | 11/2003 | Lafond | B01L 9/06 |
| | | | 206/443 |
| 6,832,685 B2 | 12/2004 | Chang | |
| 6,971,506 B2 | 12/2005 | Hassinen et al. | |
| 7,152,837 B1 | 12/2006 | Babjak | |
| 7,213,592 B2 | 5/2007 | Fischhaber et al. | |
| 7,232,038 B2 * | 6/2007 | Whitney | B01L 9/06 |
| | | | 211/74 |
| 7,258,240 B2 * | 8/2007 | Wescott, III | B01L 9/06 |
| | | | 211/74 |
| 7,455,733 B2 | 11/2008 | Lee et al. | |
| 8,148,169 B2 | 4/2012 | Gjerde et al. | |
| 8,230,997 B1 | 7/2012 | McWilliams et al. | |
| D703,882 S * | 4/2014 | Williams | D32/3 |
| 8,875,885 B2 | 11/2014 | Padden et al. | |
| 8,955,697 B2 | 2/2015 | Spilotro | |
| 9,403,270 B2 | 8/2016 | Lin | |
| 9,908,676 B2 * | 3/2018 | Sheehan | C03C 21/002 |
| 2002/0070185 A1 | 6/2002 | Chen | |
| 2002/0108917 A1 * | 8/2002 | Maruyama | B01L 9/06 |
| | | | 211/74 |
| 2004/0140277 A1 | 7/2004 | Comartin et al. | |
| 2005/0207945 A1 | 9/2005 | Itoh | |
| 2006/0027586 A1 | 2/2006 | Longhany et al. | |
| 2006/0198765 A1 | 9/2006 | Gjerde et al. | |
| 2007/0094924 A1 | 5/2007 | Wingerden | |
| 2008/0185352 A1 | 8/2008 | O'Hara | |
| 2009/0155506 A1 | 6/2009 | Martin et al. | |

(56) References Cited

U.S. PATENT DOCUMENTS

| | | | |
|---|---|---|---|
| 2010/0089938 A1* | 4/2010 | Motadel | B01L 9/543 221/1 |
| 2010/0163502 A1 | 7/2010 | Chang | |
| 2010/0258515 A1 | 10/2010 | Chen | |
| 2011/0084039 A1 | 4/2011 | Walters et al. | |
| 2011/0113974 A1 | 5/2011 | D'Amato et al. | |
| 2011/0132853 A1 | 6/2011 | Drobot et al. | |
| 2011/0200500 A1* | 8/2011 | Feilders | B01L 7/00 422/537 |
| 2011/0240577 A1 | 10/2011 | Jones et al. | |
| 2011/0293942 A1 | 12/2011 | Cornejo et al. | |
| 2012/0037529 A1 | 2/2012 | Hall | |
| 2012/0051987 A1 | 3/2012 | Johnson et al. | |
| 2012/0085720 A1 | 4/2012 | Bettenhausen et al. | |
| 2012/0292273 A1 | 11/2012 | McNamara | |
| 2012/0305507 A1 | 12/2012 | Herchenbach et al. | |
| 2013/0171456 A1 | 7/2013 | Fadeev et al. | |
| 2013/0219965 A1 | 8/2013 | Allan et al. | |
| 2013/0277322 A1 | 10/2013 | Tiberio | |
| 2014/0014605 A1* | 1/2014 | Kilgore | A47L 15/501 211/85.25 |
| 2014/0093438 A1 | 4/2014 | Yanez et al. | |
| 2014/0112845 A1 | 4/2014 | Edens et al. | |
| 2014/0166520 A1 | 6/2014 | Hoppe et al. | |
| 2014/0239022 A1 | 8/2014 | Dovell | |
| 2014/0305825 A1 | 10/2014 | Holley, Jr. | |
| 2014/0332428 A1 | 11/2014 | Holley, Jr. | |
| 2014/0332429 A1 | 11/2014 | Boersma et al. | |
| 2015/0001116 A1 | 1/2015 | Schmal et al. | |
| 2015/0048091 A1* | 2/2015 | Chan | A47L 15/505 220/485 |
| 2015/0210457 A1 | 7/2015 | DiMauro | |
| 2015/0246761 A1 | 9/2015 | Holley, Jr. et al. | |
| 2016/0052125 A1 | 2/2016 | Steele et al. | |
| 2016/0157606 A1* | 6/2016 | Kaelin | B08B 9/42 211/74 |
| 2016/0167041 A1* | 6/2016 | Curry | B01L 3/0275 422/526 |
| 2016/0214888 A1* | 7/2016 | Morgan | B08B 9/423 |
| 2018/0148373 A1* | 5/2018 | Harris | B08B 9/42 |
| 2019/0152847 A1* | 5/2019 | Allan | C03C 21/002 |

FOREIGN PATENT DOCUMENTS

| | | |
|---|---|---|
| CN | 202138856 U | 2/2012 |
| CN | 102700831 A | 10/2012 |
| CN | 203561180 U | 4/2014 |
| DE | 2255316 A1 | 5/1974 |
| DE | 2618522 A1 | 11/1977 |
| FR | 2550517 A1 | 2/1985 |
| GB | 617777 A | 2/1949 |
| GB | 736837 A | 9/1955 |
| GB | 940041 A | 10/1963 |
| GB | 1345239 A | 1/1974 |
| GB | 1391380 A | 4/1975 |
| GB | 1491796 A | 11/1977 |
| JP | 2002240817 A | 8/2002 |
| RU | 1813803 C | 5/1993 |
| RU | 2046032 C1 | 10/1995 |
| RU | 2074104 C1 | 2/1997 |
| RU | 2093437 C1 | 10/1997 |
| RU | 2142394 C1 | 12/1999 |
| RU | 2160721 C2 | 12/2000 |
| RU | 2413686 C2 | 3/2011 |
| SU | 284694 A1 | 10/1970 |
| SU | 1205909 A1 | 1/1986 |

OTHER PUBLICATIONS

English Translation of Chinese 1st Office Action and Search Report dated Nov. 8, 2019, for CN Patent Application No. 201680027673.3. pp. 1-19.

English translation of Russian 1st Office Action and Search Report dated Oct. 10, 2019, for RU Patent Application No. 2017138382. pp. 1-10.

English Translation of Taiwan 1st Office Action & Search Report dated Nov. 21, 2018, for TW Patent Application No. 104125677. pp. 1-7.

International Search Report & Written Opinion dated Oct. 29, 2015 for PCT/US2015/042012 filed Jul. 24, 2015. pp. 1-9.

International Search Report & Written Opinion dated Oct. 23, 2015 for PCT/US2015/042016 filed Jul. 24, 2015. pp. 1-9.

International Search Report & Written Opinion dated Nov. 2, 2015 for PCT/US2015/042033 filed Jul. 24, 2015. pp. 1-9.

International Search Report & Written Opinion dated Oct. 29, 2015 for PCT/US2015/042007 filed Jul. 24, 2015. pp. 1-9.

International Search Report & Written Opinion dated Aug. 30, 2016 for PCT/US2016/031647 filed May 10, 2016. pp. 1-12.

Notice of Allowance dated Sep. 14, 2016 for U.S. Appl. No. 14/808,728, filed Jul. 24, 2015. pp. 1-13.

Non-Final Office Action dated Feb. 23, 2017, for U.S. Appl. No. 14/808,734, filed Jul. 24, 2015. pp. 1-9.

Non-Final Office Action dated Mar. 13, 2017, for U.S. Appl. No. 14/808,702, filed Jul. 24, 2015. pp. 1-10.

Non-Final Office Action dated Mar. 28, 2017, for U.S. Appl. No. 14/808,710, filed Jul. 24, 2015. pp 1-10.

Final Office Action dated May 25, 2017, for U.S. Appl. No. 14/808,734, filed Jul. 24, 2015. pp. 1-7.

English translation of Russian Decision of Grant and Search Report dated Feb. 1, 2019, for RU Patent Application No. 2017107535. pp. 1-16.

\* cited by examiner

APPARATUSES AND METHODS FOR HOLDING, RETAINING, AND/OR PROCESSING GLASSWARE ARTICLES

CROSS REFERENCE TO RELATED APPLICATIONS

The present application claims priority to U.S. patent application Ser. No. 15/151,168, filed May 10, 2016, entitled "APPARATUSES AND METHODS FOR HOLDING, RETAINING, AND/OR PROCESSING GLASSWARE ARTICLES," which claimed priority to U.S. Provisional Application No. 62/159,653 filed May 11, 2015, entitled, "Apparatuses and Methods for Holding, Retaining, and/or Processing Glassware Articles," the entirety of each of which are incorporated by reference herein.

BACKGROUND

Field

The present specification generally relates to magazine apparatuses for holding and retaining glass articles during processing and, more specifically, to magazine apparatuses for holding and retaining glass articles during ion-exchange processing.

Technical Background

Historically, glass has been used as a preferred material for many applications, including food and beverage packaging, pharmaceutical packaging, kitchen and laboratory glassware, and windows or other architectural features, because of its hermeticity, optical clarity, and excellent chemical durability relative to other materials.

However, use of glass for many applications is limited by the mechanical performance of the glass. In particular, glass breakage is a concern, particularly in the packaging of food, beverages, and pharmaceuticals. Breakage can be costly in the food, beverage, and pharmaceutical packaging industries because, for example, breakage within a filling line may require that neighboring unbroken containers be discarded as the containers may contain fragments from the broken container. Breakage may also require that the filling line be slowed or stopped, lowering production yields. Further, non-catastrophic breakage (i.e., when the glass cracks but does not break) may cause the contents of the glass package or container to lose their sterility which, in turn, may result in costly product recalls.

One root cause of glass breakage is the introduction of flaws in the surface of the glass as the glass is processed and/or during subsequent filling. These flaws may be introduced in the surface of the glass from a variety of sources including contact between adjacent pieces of glassware and contact between the glassware and equipment, such as handling and/or filling equipment. Regardless of the source, the presence of these flaws may ultimately lead to glass breakage.

Additionally, ion-exchanged glass, sometimes referred to as chemically strengthened glass, may provide additional strength. However, both the exterior portion and the interior portion of a glass container must be contacted with an ion-exchange bath to balance the stresses imparted to the glass. Suitably securing glass containers to allow for complete submersion in an ion-exchange bath while not introducing flaws on the surface of the glass is difficult.

Accordingly, a need exists for alternative apparatuses for holding glass articles during processing to mitigate glass breakage while allowing for full contact of the interior and exterior regions of glass articles with processing baths, such as ion-exchange baths.

SUMMARY

According to one embodiment, an apparatus may hold and retain glass articles during processing. The apparatus may define a plurality of receiving volumes for holding glass articles. The apparatus may comprise a bottom support floor, a glassware-securing member positioned above the bottom support floor, and a cover plate positioned above the glassware-securing member. The bottom support floor may comprise a plurality of fluid passages, the glassware-securing member may comprise a plurality of glassware-retaining openings, and the cover plate may comprise a plurality of fluid passages. Each of the bottom support floor, the glassware-securing member, and the cover plate may be substantially planar. The bottom support floor, the glassware-securing member, and the cover plate may be substantially parallel with one another. Each glassware-retaining opening of the glassware-securing member may define a width dimension of the receiving volume. The bottom support floor and the cover plate may define a height dimension of the receiving volume.

In another embodiment, an assembly may hold and retain glass articles during processing. The assembly may comprise a plurality of magazine apparatuses, and one or more of the magazine apparatuses may define a plurality of receiving volumes. One or more of the magazine apparatuses may comprise a bottom support floor, a glassware-securing member positioned above the bottom support floor, and a cover plate positioned above the glassware-securing member. The bottom support floor may comprise a plurality of fluid passages, the glassware-securing member may comprise a plurality of glassware-retaining openings, and the cover plate may comprise a plurality of fluid passages. Each of the bottom support floor, the glassware-securing member, and the cover plate may be substantially planar. The bottom support floor, the glassware-securing member, and the cover plate may be substantially parallel with one another. Each glassware-retaining opening of the glassware-securing member may define a width dimension of the receiving volume. The bottom support floor and cover plate may define a height dimension of the receiving volume.

In yet another embodiment, a method for ion-exchanging glass articles may comprise supplying an apparatus or assembly for holding and retaining glass articles during processing, positioning one or more glass articles in one or more of the receiving volumes of the apparatus or assembly, and at least partially submerging the apparatus or assembly in an ion-exchange bath to contact the one or more glass articles with the ion-exchange bath.

Additional features and advantages of the apparatuses described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
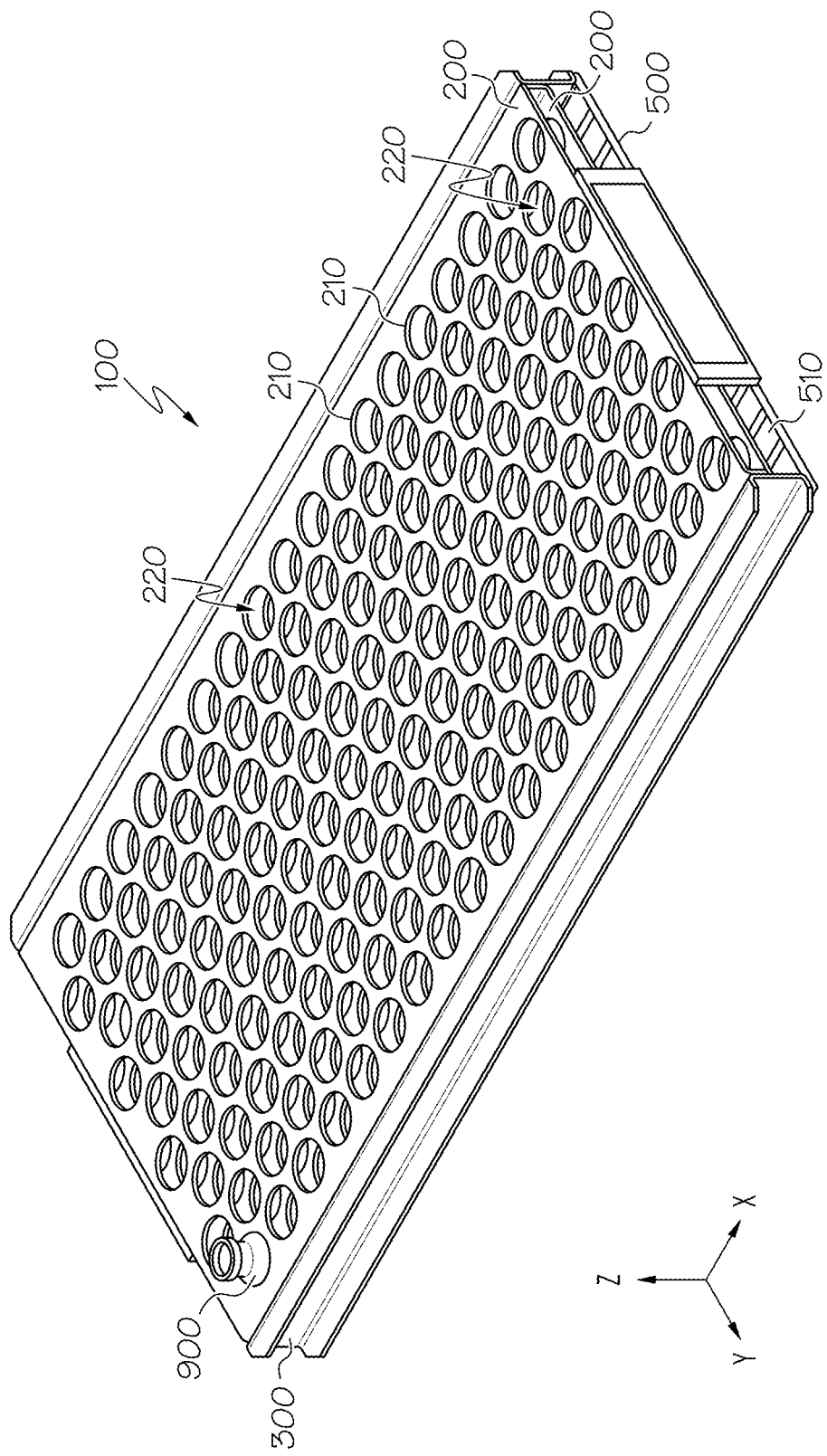
FIG. 1 schematically depicts a perspective view of a magazine apparatus without a cover plate, according to one or more embodiments shown and described herein.

Reference will now be made in detail to embodiments of magazine apparatuses for holding and retaining glass articles during processing, examples of which are illustrated in the accompanying drawings. Whenever possible, the same reference numerals will be used throughout the drawings to refer to the same or like parts. One embodiment of an apparatus for holding and retaining glass articles during processing is schematically depicted in FIG. 1. The magazine apparatus generally comprises a plurality of receiving volumes, where each receiving volume can hold and retain a glass article, such as a vial. The magazine apparatus may be suitable to securely hold the glass articles as they are submerged in an ion-exchange salt bath. For example, in one embodiment, glass articles may be secured in the magazine apparatus and the magazine apparatus may be submerged in an ion-exchange bath in a process which chemically strengthens the glass articles. In some embodiments, several magazine apparatuses may be coupled with one another in an assembly, and the assembly may be submerged in the ion-exchange bath. Generally, the magazine apparatuses may be suitable to be manipulated such that the glass articles may be submerged into the ion-exchange bath at an angle non-normal relative to the surface of the bath.

The magazine apparatuses described herein may be suitable to hold and retain glass articles, such as glass containers with a wide variety of geometries. As used herein, "glass article" may refer to any glassware, such as, but not limited to glass formed in the shape of a vial, ampoule, ampul, bottle, flask, phial, beaker, bucket, carafe, vat, syringe body, cartridge or the like. Additionally, "glass articles" may be referred to herein as "glassware" and these terms may be interchangeable. Various embodiments of apparatuses for holding and retaining glass articles during processing will be described in further detail herein with specific reference to the appended drawings.

As noted herein, the breakage of glass articles during processing and/or filling is a source of product loss and may lead to process inefficiencies and increased costs. Additionally, cosmetic flaws in glass articles are often undesirable to users. Strengthening of glass articles can assist in mitigating breakage and scratching. Glass articles can be strengthened using a variety of techniques, including chemical and thermal tempering. For example, chemical tempering, sometimes called ion-exchange strengthening, can be used to strengthen glass articles through the introduction of a layer of compressive stress in the surface of the glass articles. The compressive stress is introduced by submerging the glass article in a molten salt bath, sometimes referred to as an ion-exchange bath. As ions from the glass are replaced by relatively larger ions from the molten salt, a compressive stress is induced in the surface of the glass. During chemical tempering, glass articles, such as glass containers, may be mechanically manipulated to both fill and empty the glass articles of molten salt.

While chemical tempering improves the strength of the glass articles, mechanical manipulation of the glass articles during the strengthening process may introduce flaws in the surface of the glass. For example, contact between the glass articles and the fixturing, such as a magazine apparatus, used to retain the glass articles during processing, may introduce flaws in the glass, particularly when the glass articles and the fixturing are initially submerged in the molten salt bath and/or when the fixturing and glass articles are withdrawn from the molten salt bath and rotated to empty the glass articles of molten salt. Specifically, as a glass article is submerged it may be buoyant and thus be propelled upward relative to the fixturing. Moreover, after the ion-exchange process is complete, the fixturing and glass articles are withdrawn from the molten salt bath and the fixturing is rotated to empty the glass articles of molten salt contained within the interior volume of the glass articles. As the fixturing is rotated, the glass articles may abruptly collide with the fixturing. This blunt force impact between the glass articles and the fixturing may introduce flaws in the surface of the glass.

In most cases the flaws are superficial and are contained within the layer of surface compressive stress induced in the glass. This surface compressive stress prevents the flaws from growing into cracks. However, in some cases, the flaws may extend through the layer of surface compressive stress which may lead to breakage of the glass articles.

The magazine apparatuses for holding and retaining glass articles during processing described herein mitigate the introduction of flaws in the glass articles retained therein.

Figure 2:
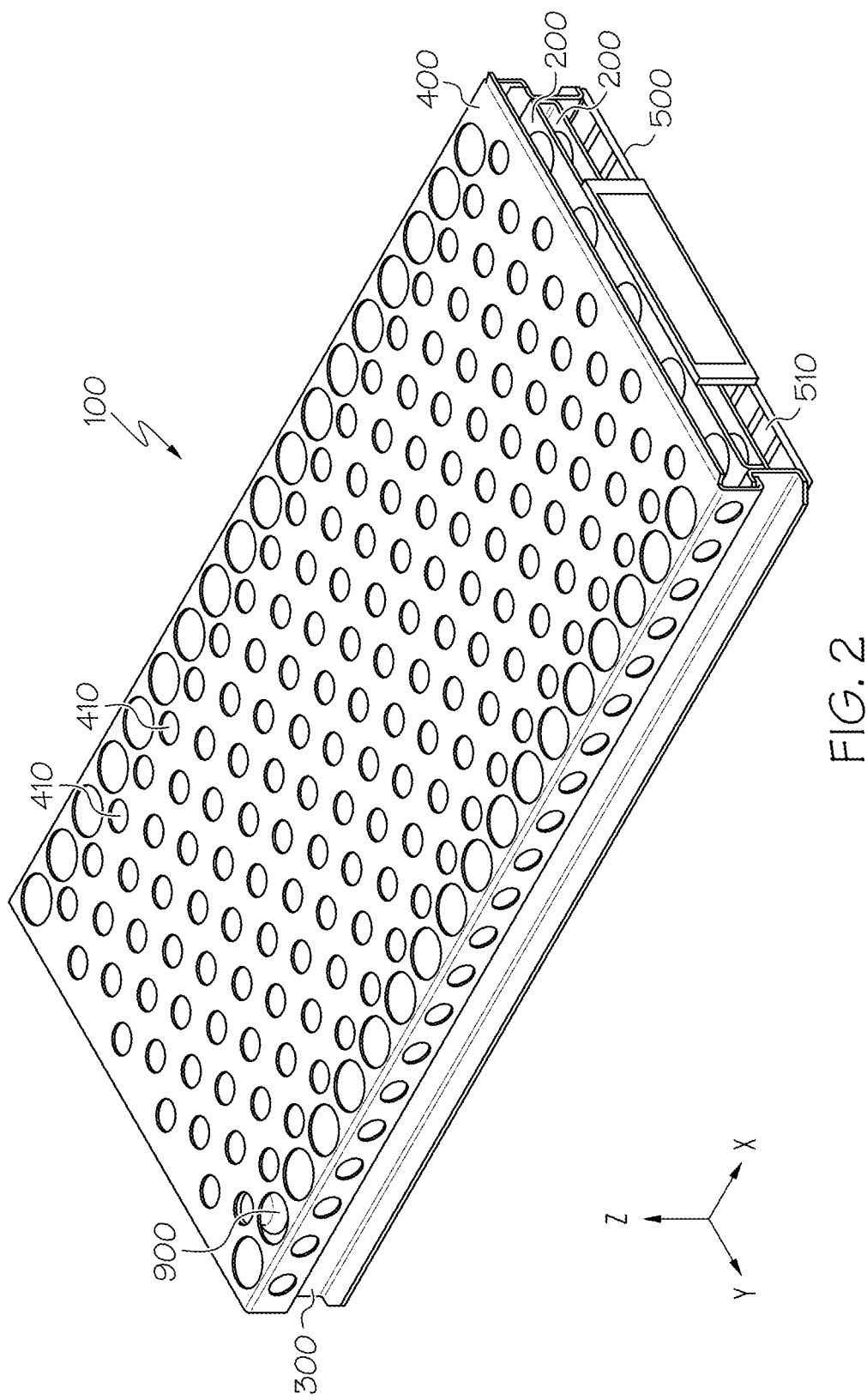
FIG. 2 schematically depicts a perspective view of a magazine apparatus with a cover plate, according to one or more embodiments shown and described herein.
Figure 3:
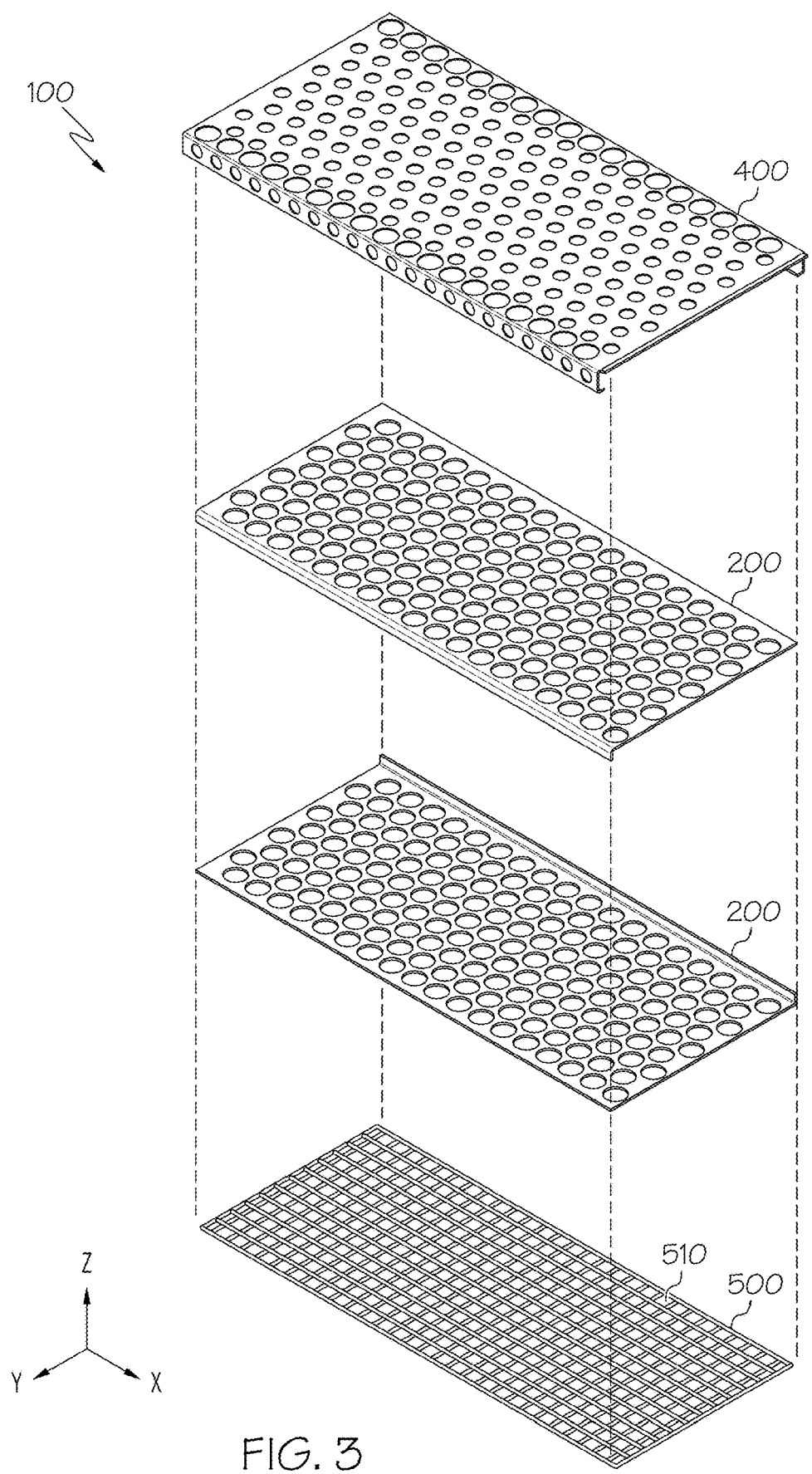
FIG. 3 schematically depicts an exploded view of a magazine apparatus, according to one or more embodiments shown and described herein.

Additionally, the magazine apparatuses described herein allow for acceptable levels of fluid contact by the molten salt bath with all areas (interior and exterior) of the glass article when the magazine apparatus is partially or fully submerged in the molten salt bath. Referring now to FIGS. 1, 2 and 3, one embodiment of a magazine apparatus 100 for holding and retaining glass articles 900 during processing is schematically depicted. The magazine apparatus 100 generally includes a bottom support floor 500, a plurality of glassware-securing members 200, and a cover plate 400. Specifically, FIG. 1 shows a magazine apparatus 100 which does not have an attached cover plate 400, and FIG. 2 shows a magazine apparatus 100 with an attached cover plate 400. FIG. 3 shows an exploded view of the bottom support floor 500, the glassware-securing members 200, and the cover plate 400. When the magazine apparatus 100 does not have an attached cover plate 400, glass articles 900 may be freely moved into and out of the magazine apparatus 100. However, when the cover plate 400 of the magazine apparatus 100 is positioned over the glassware-securing members 200, glass articles 900 positioned in the magazine apparatus 100 are retained as the magazine apparatus 100 is manipulated and maneuvered, including when the magazine apparatus 100 is rotated about a horizontal axis to facilitate emptying the glass articles 900 of a processing fluid. In other embodiments, the magazine apparatus 100 may not have an attached cover plate 400, and may instead utilize another section of an adjacently stacked magazine apparatus, such as the bottom support floor of a magazine apparatus stacked above the magazine apparatus 100, as its cover plate 400. It should be understood that, as used herein, a cover plate 400 may be a separate structure that is attached to the bottom support floor 500 and/or glassware-securing members 200 or may be a portion of another magazine apparatus 100.

Figure 4:
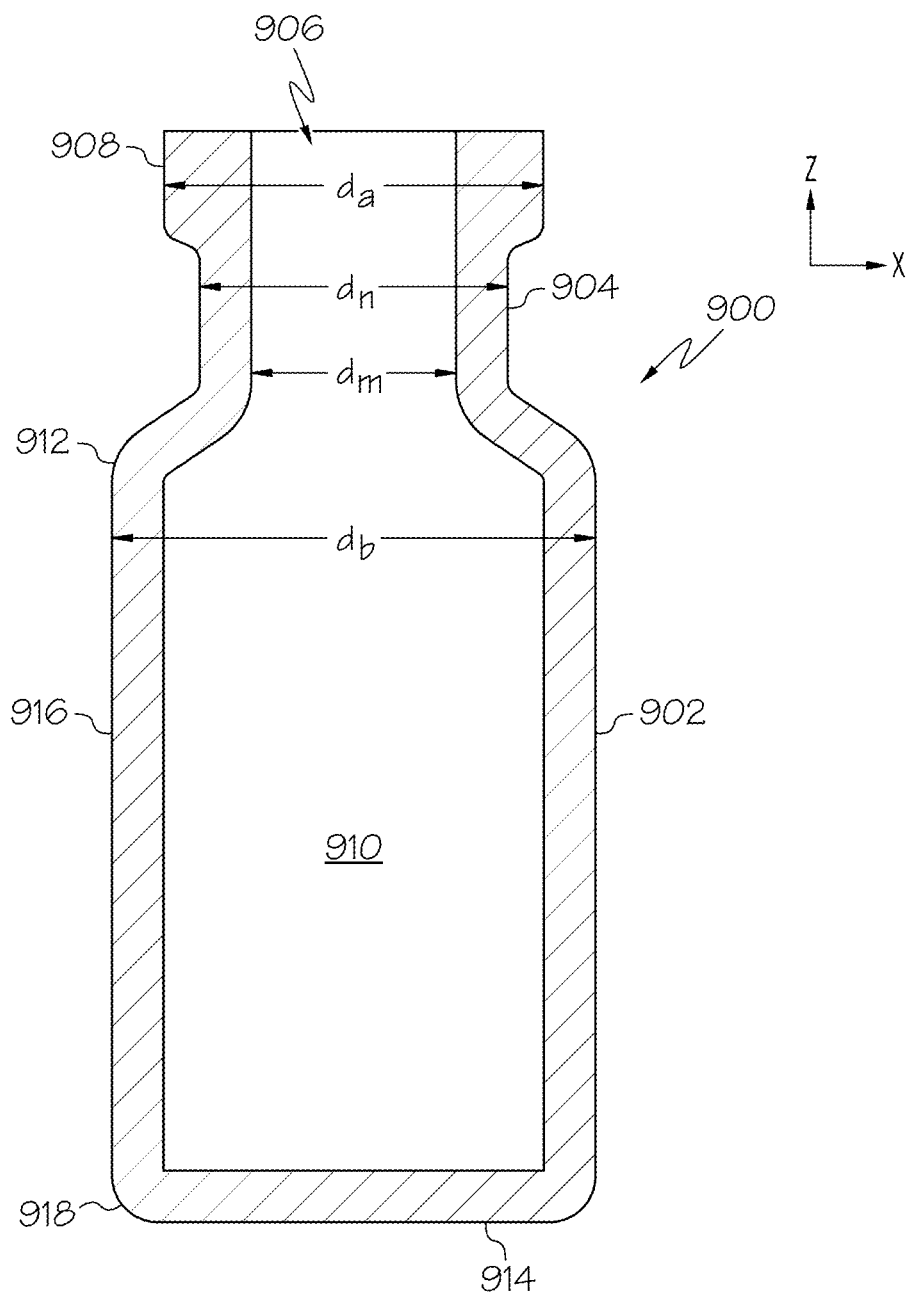
FIG. 4 schematically depicts a cross-sectional view of a glass article, according to one or more embodiments shown and described herein.

In one embodiment, the components of the magazine apparatus 100 may be shaped and sized to securely hold glass articles 900 shaped as vials. As shown in FIG. 4, the glass articles 900 may generally include a body section 902, a neck section 904 above the body section 902, and an opening 906 leading through the neck and connected to the interior volume 910. The body section 902 substantially surrounds the interior volume 910 of the glass articles 900 with a bottom section 914 and side walls 916. The neck section 904 generally connects the body section 902 with the opening 906. The opening 906 may be surrounded by a collar 908 extending outward from the top of the neck section 904 of the glass article 900. The body section 902 may have a curved bottom edge 918 and a curved area 912 adjacent the neck section 904. Generally, the neck section 904, body section 902, and collar 908 may have a generally circular-shaped cross section, each comprising an exterior diameter. In one embodiment, the diameter of the collar ($d_a$ in FIG. 4) is greater than the diameter of the neck section ($d_n$ in FIG. 4) and the diameter of the body section ($d_b$ in FIG. 4) is greater than the diameter of the collar, $d_a$. Additionally, the opening 906 comprises a diameter ($d_m$ in FIG. 4), referred to sometimes herein as the diameter of the mouth, which is less than the diameter of the neck ($d_n$). Each glass articles 900 may have a major axis (in the Z-direction in FIG. 4) which may be normal to the diameter of the body $d_b$ and the diameter of the opening $d_m$.

Generally, the bottom support floor 500 may be substantially planar in shape, and the glass articles 900 rest upon the bottom support floor 500. As shown in FIG. 3, the bottom support floor 500 is planar, and a length (i.e., the dimension in the X-direction) and width (i.e., the dimension in the Y-direction) of the bottom support floor are much greater than the height (i.e., in the Z-direction) of the bottom support floor 500. The bottom support floor 500 may comprise fluid passages 510 to allow a processing fluid, such as the molten salt bath used in ion-exchange processing, to pass through the bottom support floor 500 and contact the glass articles 900 positioned in the magazine apparatus 100. In embodiments, the bottom support floor 500 may be formed from a rigid wire mesh, as depicted in FIGS. 1-3. In other embodiments, the bottom support floor 500 may comprise a planar sheet formed with machined holes which allow for a processing fluid, such as the molten salt bath used in ion-exchange processing, to pass through the bottom support floor 500 and contact the glass articles 900 positioned in the magazine apparatus 100. Alternatively, the bottom support floor 500 may be constructed with any generally planar geometry and with openings which allows for the passage of a fluid through the bottom support floor 500 while simultaneously supporting a plurality of glass articles 900 resting thereon. Generally, the bottom support floor 500 may be any generally planar shaped article which will allow for the passage of fluid but does not allow for the passage of glass articles 900.

Positioned above the bottom support floor 500 are one or more glassware-securing members 200. As used herein, the terms "above" or "below" generally refer to the relative positioning of components in the Z-direction of the coordinates depicted in FIGS. 1-3. The glassware-securing members 200 may be substantially planar in shape, and comprise a plurality of glassware-retaining openings 210. As shown in FIG. 3, the glassware-securing members 200 are substantially planar, and a length (i.e., in the dimension of the X-direction) and a width (i.e., in the dimension of the Y-direction) of the glassware-securing member 200 are much greater than the height (i.e., in the dimension of the Z-direction) of the glassware-securing member 200. While FIGS. 1-3 depict embodiments of magazine apparatuses 100 comprising two glassware-securing members 200, there can be any number of glassware-securing members 200 positioned between the bottom support floor 500 and the cover plate 400, such as one, three, four, five, six, or even more glassware-securing members. Multiple glassware-securing members 200 may be positioned in a generally parallel configuration. The number of glassware-securing members 200 may depend on the geometry of the glass articles 900 being retained.

Each glassware-securing member 200 comprises glassware-retaining openings 210 which at least partially define a receiving volume 220 in which a single glass article 900 can be received and secured. In one embodiment, the glassware-retaining openings 210 of the glassware-securing member 200 are approximately circularly shaped. Such an embodiment may be suitable for housing glass articles with circular exterior cross sections, such as those depicted in FIG. 4. However, in other embodiments, the glassware-retaining openings 210 may have geometries other than circular, such as triangular, rectangular, pentagonal, or other geometries suitable to securely house glass articles 900 with cross-sectional geometries that are non-circular. The glassware-retaining openings 210 may be slightly larger than the largest cross-sectional diameter of the glass articles 900 to be received and secured therein, shown in the embodiment of FIG. 4 as $d_b$.

The glassware-retaining openings 210 may be arranged in two dimensional arrays in the X-direction and Y-direction. For example, the glassware-retaining openings 210 could be arranged in rows and columns, or could be arranged in other configurations such as the offset pattern shown in FIG. 1.

In embodiments, a cover plate 400 may be positioned above the bottom support floor 500 and glassware-securing members 200. The cover plate 400 may be substantially planar in shape and comprise a plurality of fluid passages 410. As shown in FIG. 3, the cover plate 400 is substantially planar, and a length (i.e., in the dimension of the X-direction) and width (i.e., in the dimension of the Y-direction) of the cover plate 400 is much greater than the height (i.e., in the dimension of the Z-direction) of the cover plate 400.

The cover plate 400 comprises fluid passages 410 which allow for a processing fluid, such as the molten salt bath used in ion-exchange processing, to flow through the cover plate 400 and into the interior region of the magazine apparatus 100. In one embodiment, the fluid passages 410 of the cover plate 400 are approximately circularly shaped. Such an embodiment may be suitable for housing glass articles 900 with circular mouth cross sections, such as those depicted in FIG. 4. However, in other embodiments, the fluid passages 410 may have geometries other than circular. The fluid passages 410 may be arranged in two dimensional arrays in the X-direction and Y-direction. For example, the fluid passages 410 could be arranged in rows and columns, or could be arranged in other configurations.

The bottom support floor 500, the glassware-securing members 200, and the cover plate 400 may be substantially parallel relative to one another. The bottom support floor 500, the glassware-retaining openings 210 in the glassware-securing members 200, and the cover plate 400 define a plurality of receiving volumes 220. Each receiving volume 220 may securely house an individual glass article 900. The bottom support floor 500 and the cover plate 400 may define a height dimension of the receiving volume 220 (in the Z-direction). The bottom support floor 500 and the cover plate 400 secure a glass article 900 in the vertical direction by restricting its movement in the vertical direction. Each glassware-retaining opening 210 of the glassware-securing member 200 defines a width dimension (in the X-direction and Y-direction of FIG. 1) of the receiving volume 220. As such, the glassware-retaining opening 210 secures a glass article 900 by restricting its movement in the width direction (X-direction and Y-direction of FIG. 1). Generally, the glass article 900 is positioned in a receiving volume where its major axis is in the height dimension.

The magazine apparatus 100 may further comprise vertical supports 300 that securely connect the bottom support floor 500, the glassware-securing members 200, and may removably secure the cover plate 400. The vertical supports 300 can be any mechanical fastening device suitable to connect the bottom support floor 500, the glassware-securing members 200, and/or the cover plate 400 with one another. In some embodiments, all or at least a portion of the vertical support 300 may comprise a unitary body. In one embodiment, one or more of the bottom support floor 500, the glassware-securing members 200, the cover plate 400, and the vertical support 300 may be formed as a unitary body. In other embodiments, one or more of the bottom support floor 500, the glassware-securing members 200, the cover plate 400, and the vertical support 300 may be secured together by mechanical means such as, but not limited to, screws, bolts, welding, glued, etc. Note that FIG. 3 does not depict vertical supports 300. In one embodiment, the vertical supports 300 may allow for the cover plate 400 to be removably attached to the other sections of the magazine apparatus 100.

Figure 5:
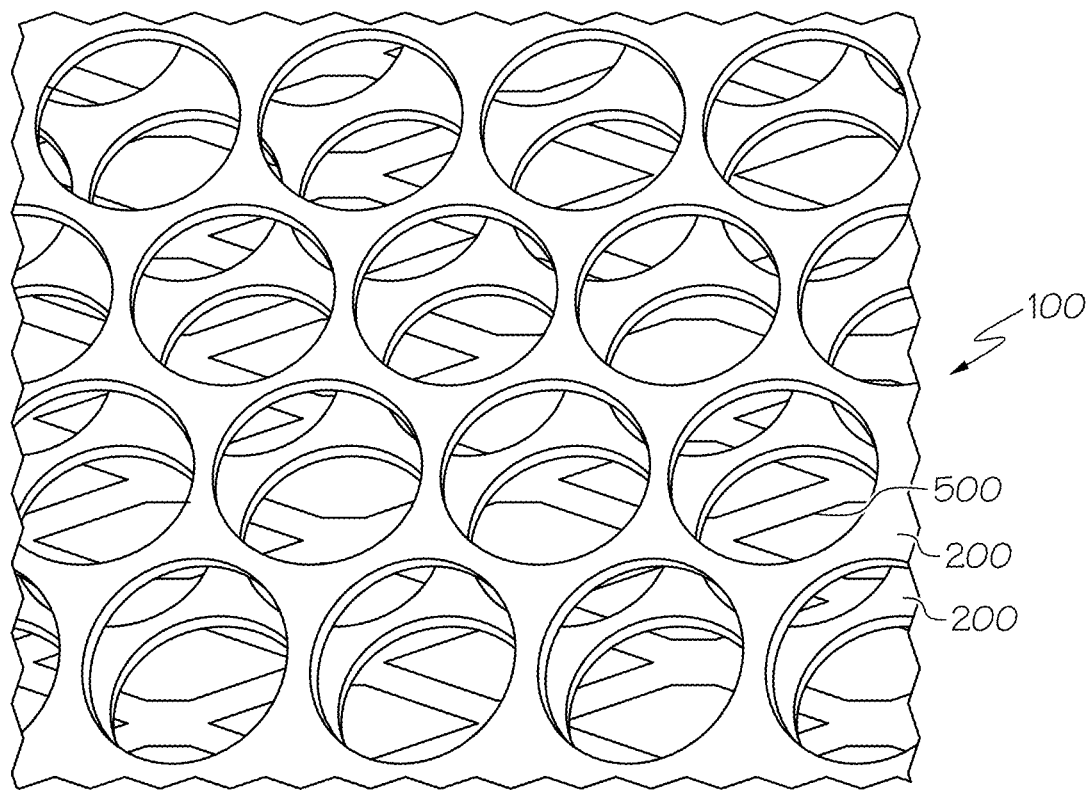
FIG. 5 schematically depicts an enlarged perspective view of a magazine apparatus without a cover plate, according to one or more embodiments shown and described herein.
Figure 6:
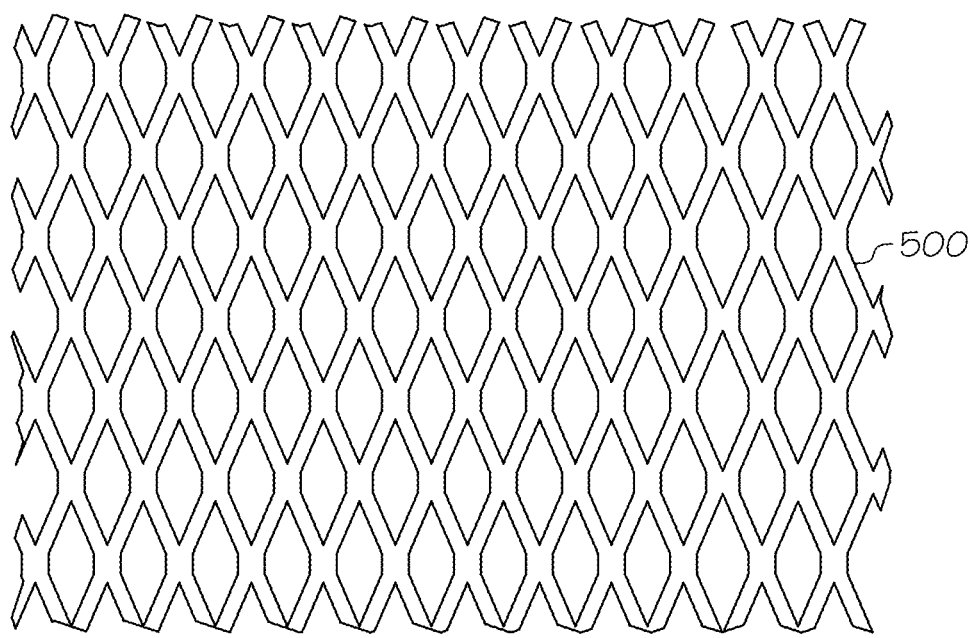
FIG. 6 schematically depicts the bottom support floor of FIG. 5, according to one or more embodiments shown and described herein.
Figure 7:
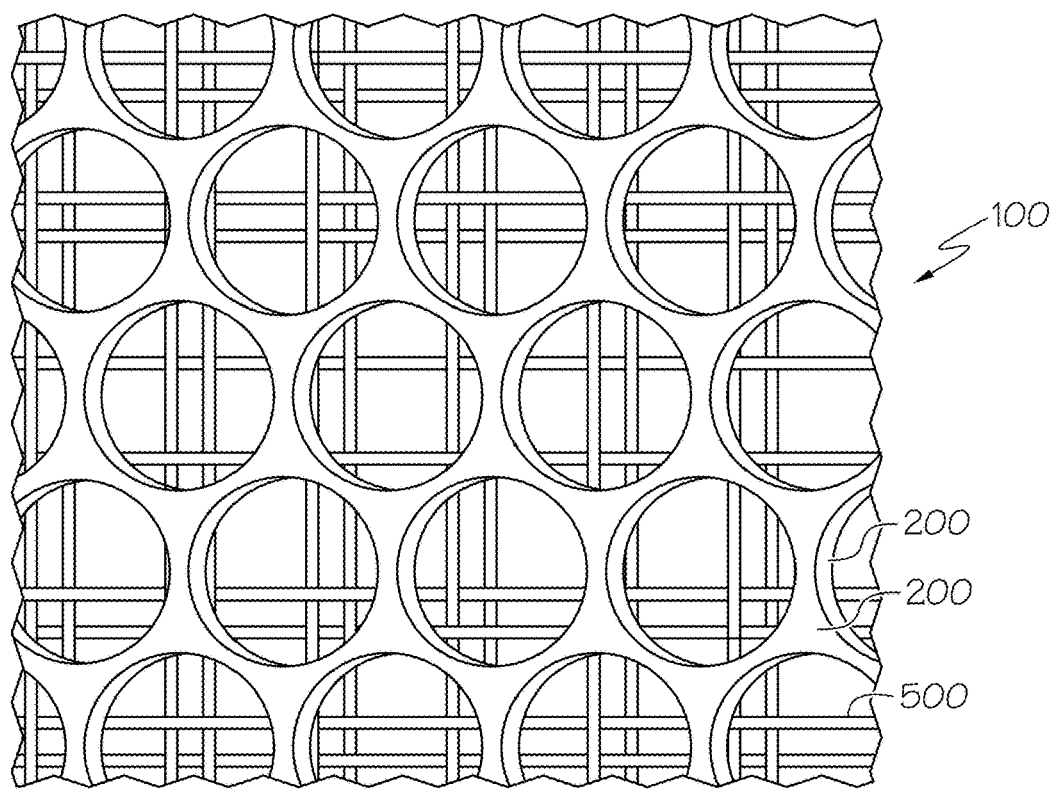
FIG. 7 schematically depicts an enlarged perspective view of a magazine apparatus without a cover plate, according to one or more embodiments shown and described herein.
Figure 8:
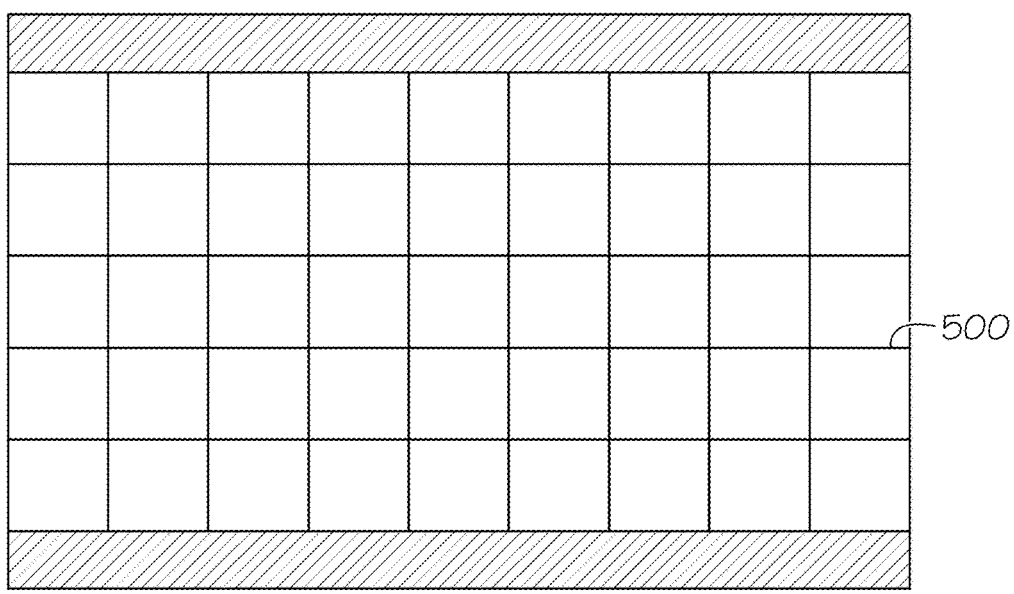
FIG. 8 schematically depicts the bottom support floor of FIG. 7, according to one or more embodiments shown and described herein.

FIGS. 5 and 7 depict embodiments of magazine apparatuses 100 (without cover plates) which have bottom support floors 500 with differing geometries. FIG. 5 shows a magazine apparatus 100 that includes a bottom support floor 500 in a diagonal crisscrossing pattern (as depicted in FIG. 6). FIG. 7 shows a magazine apparatus 100 that includes a bottom support floor 500 comprising a wire mesh geometry. FIGS. 6 and 8 show the bottom support floors 500 of the magazine apparatuses 100 depicted in FIGS. 5 and 7, respectively.

In one embodiment, one or more of the fluid passages 410 may be aligned with the glassware-retaining openings 210. For example, each fluid passage 410 may be positioned directly above a glassware-retaining opening 210, as is shown in FIGS. 1-3. The diameter of each fluid passage 410 may be less than the diameter of each glassware-retaining opening 210. In one embodiment, the magazine apparatus 100 may be designed to house glass articles similar or identical in geometry to the glass article depicted in FIG. 4. The glassware-retaining openings 210 may have a diameter slightly larger than the body ($d_b$) of the glass article 900. In some embodiments such as, but not limited to, embodiments where the fluid passages 410 are aligned with the glassware-retaining openings 210, the fluid passages 410 may be smaller than the $d_b$ of the glass articles 900. In one embodiment, the diameter of each fluid passage 410 above a glassware-retaining opening 210 may be less than the diameter of each glassware-retaining opening 210. Each fluid passage 410 may have a diameter that is larger than the diameter of the mouth $d_m$ and less than the diameter of the collar $d_a$ of a housed glass article 900. In such a configuration, the opening 906 is not blocked by the cover plate 400 but the glass article 900 is constrained in movement because its collar diameter $d_a$ is greater than the diameter of the fluid passage 410.

In another embodiment, a single fluid passage 410 may aligned and shaped to allow for fluid passage into several receiving volumes 220 defined by several glassware-retaining openings 210. For example, the fluid passages 410 may be shaped as an elongated channels with ends shaped as semi-circles of the same diameter, and connecting the two semi-circle shaped ends are a channel having the width of the diameter of the semi-circles. The diameter of the semi-circles may be equal to the ranges described herein with reference to the circular shaped fluid passages 410. Referring to FIG. 2, in such an embodiment, the portion of the cover plate 400 situated between adjacent circularly shaped fluid passages 410 could be eliminated, forming elongated fluid passages 410. In embodiments, two, three, four, five, or even more circularly shaped fluid passages oriented in a line could be combined into an elongated fluid passage 410 by eliminating the portion of the cover plate 400 positioned therebetween.

In some embodiments, the bottom support floor 500 may be substantially identical to the cover plate 400. In some of these embodiments, the magazine apparatus 100 may be stacked with another magazine apparatus 100 so that the bottom support floor 500 of a top magazine apparatus 100 serves as the cover plate 400 for a bottom magazine apparatus 100.

Without being bound by theory, it is believed that fluid passages 410 that are aligned with glassware-retaining openings 210 allow for enhanced flow of fluids into and out of the glass articles 900, as compared with some cover plate 400 geometries with more open area for fluid flow. One measure of the ability of the vial to fill is the Bond number ($B_o$), which is a measure of the relative significance of buoyant forces compared with surface tension at the meniscus/fluid-air interface at the opening of the container. In order to drive filling of the vials with a processing fluid, such as molten salt, it may be desirable to have a large Bond number where buoyancy forces (bubble formation) dominate surface tension forces. In this case, the Bond number indicates a balance between surface tension and buoyant forces. The Bond number may be expressed as $B_o=(\rho g L^2)/\sigma$, where $\rho$=fluid density, g=acceleration due to gravity, L=characteristic length (radius of opening), and $\sigma$=surface tension of fluid. From this formula, in many embodiments, L is the most significant factor in whether a glass article fills, since the ratio of density to surface tension may be nearly constant for molten salt over the typical range of ion exchange temperatures. To this end it may be important to avoid any obstruction of the glass article mouth during filling.

One or more of the bottom support floor 500, the glassware-securing members 200, the vertical supports 300, the cover plate 400 may be made of metal, such as stainless steel (e.g., 304L stainless steel). However, any material is suitable that can withstand the relatively high temperatures of the molten salt bath. In one embodiment, one or more components of the magazine apparatus 100 may be fabricated by laser or water jetting of raw stainless steel sheet material into the desired flat patterns and then forming and welding the sheets into their final shape. The bottom support floor 500, the glassware-securing members 200, and/or the cover plate 400 may be electro-polished, which may deburr the sharp edges that may be created through the laser or water jetting process. Electro-polishing may also increase the surface finish which aids in the draining or sheeting of liquids from the magazine apparatus 100. In another embodiment, the bottom support floor 500, the glassware-securing members 200, and/or the cover plate 400 may be passivated following the electro-polishing, which may further increase the passive layer of the stainless steel to further increase the corrosion resistance of the magazine apparatus 100.

Figure 9:
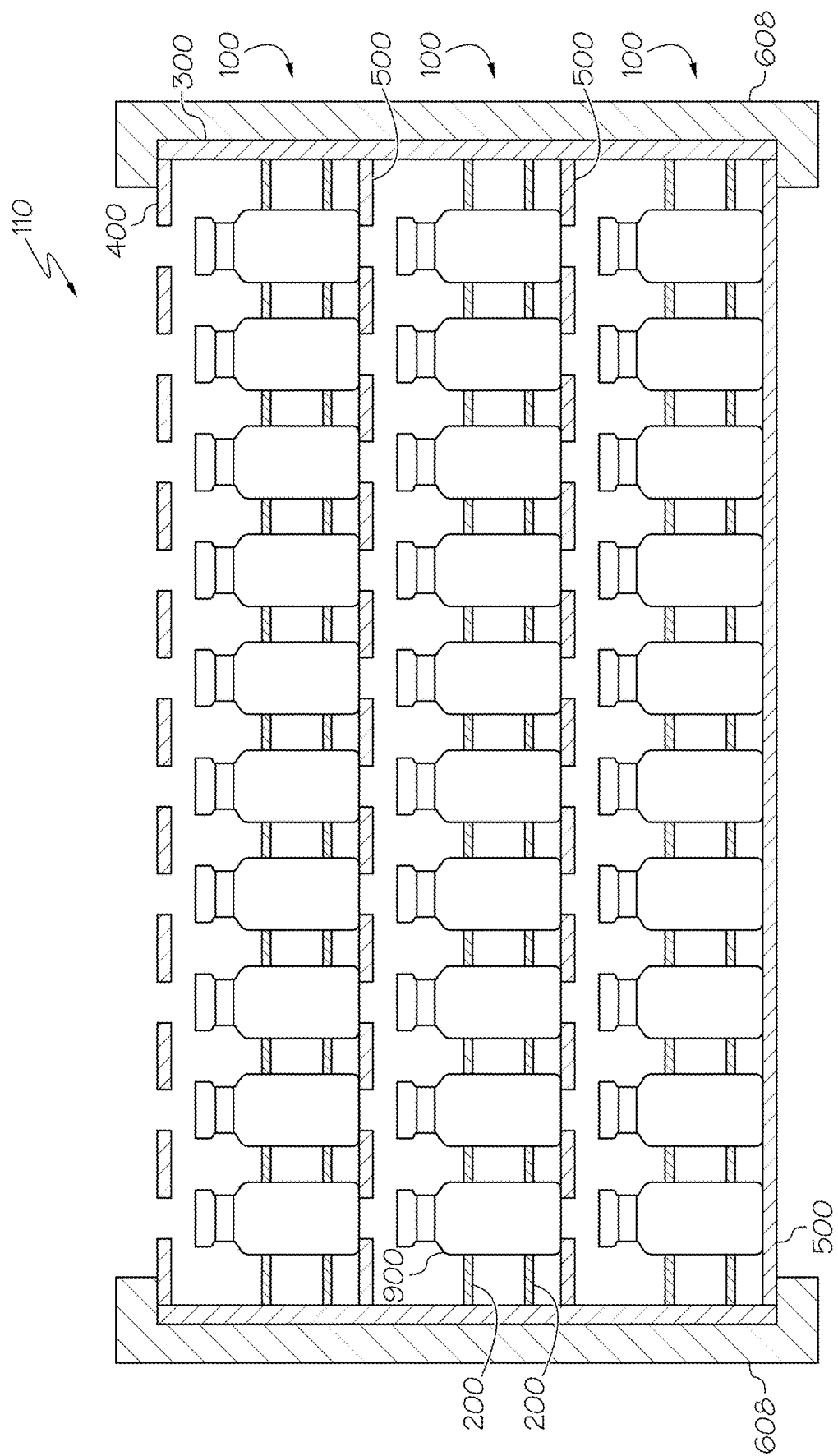
FIG. 9 schematically depict a cross-sectional view of a loaded cassette assembly, according to one or more embodiments shown and described herein.

In another embodiment, two or more magazine apparatuses 100 may be stacked adjacently and secured together in a cassette 608 to form an assembly 110, as shown in FIG. 9. In one embodiment, since two or more magazine apparatuses 100 are in contact with one another, the bottom support floor 500 of a higher positioned magazine apparatus 100 can serve as the cover plate 400 for a magazine apparatus 100 positioned below. In such an embodiment, only one cover plate 400 per assembly 110 may be included. In such an embodiment, the bottom support floor 500 may have fluid passages 510, such as those described in relation to the cover plate 400, and may be substantially identical to the cover plate 400 of the uppermost magazine apparatus 100. For example, the bottom support floor 500 may comprise fluid passages 510 which have a diameter less than $d_a$ and greater than $d_m$ of a glass article 900. In another embodiment, the cover plate 400 may be integrated with the cassette 608, such that only the top magazine apparatus 100 loaded into the cassette 608 includes a cover plate.

When vertical pressure is applied to the glass article 900, more stress may be present in the curved bottom edge 918 and a curved area 912 than the side wall 916 of the body. In embodiments, a surface scratch or other informality on the curved bottom edge 918 and a curved area 912 may be more likely to propagate into a crack which may undesirably cause complete breakage of the glass article 900. In some embodiments, glassware-securing members 200 only contact the side wall 916 of the glass article 900, as shown in FIG. 9.

It should be understood that a cover plate 400, as used herein, may include a bottom support floor of an adjacent apparatus. The cover plate 400 may not be permanently fastened to the magazine apparatus 100, such as to allow for removal of the glass articles 900. The cover plate 400 may be fastened to the magazine apparatus 100 by any suitable mechanical means, such as by fasteners, screws, bolts, or a geometry of the cover plate 400 and magazine apparatus 100 designed to stably hold the cover plate 400 to the magazine apparatus 100.

Figure 10:
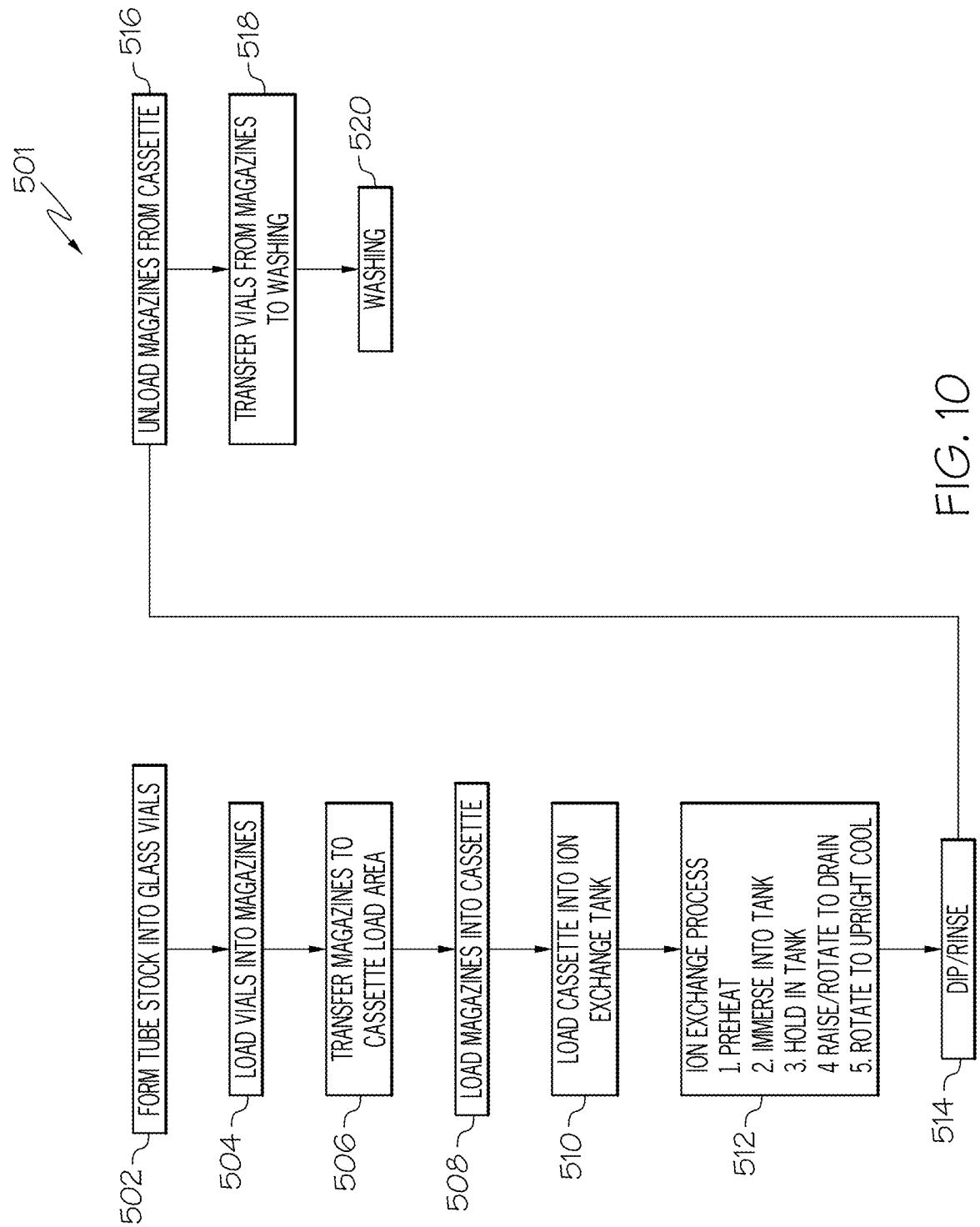
FIG. 10 depicts a process flow diagram of a method for strengthening glass articles by ion-exchange, according to one or more embodiments shown and described herein.
Figure 11:
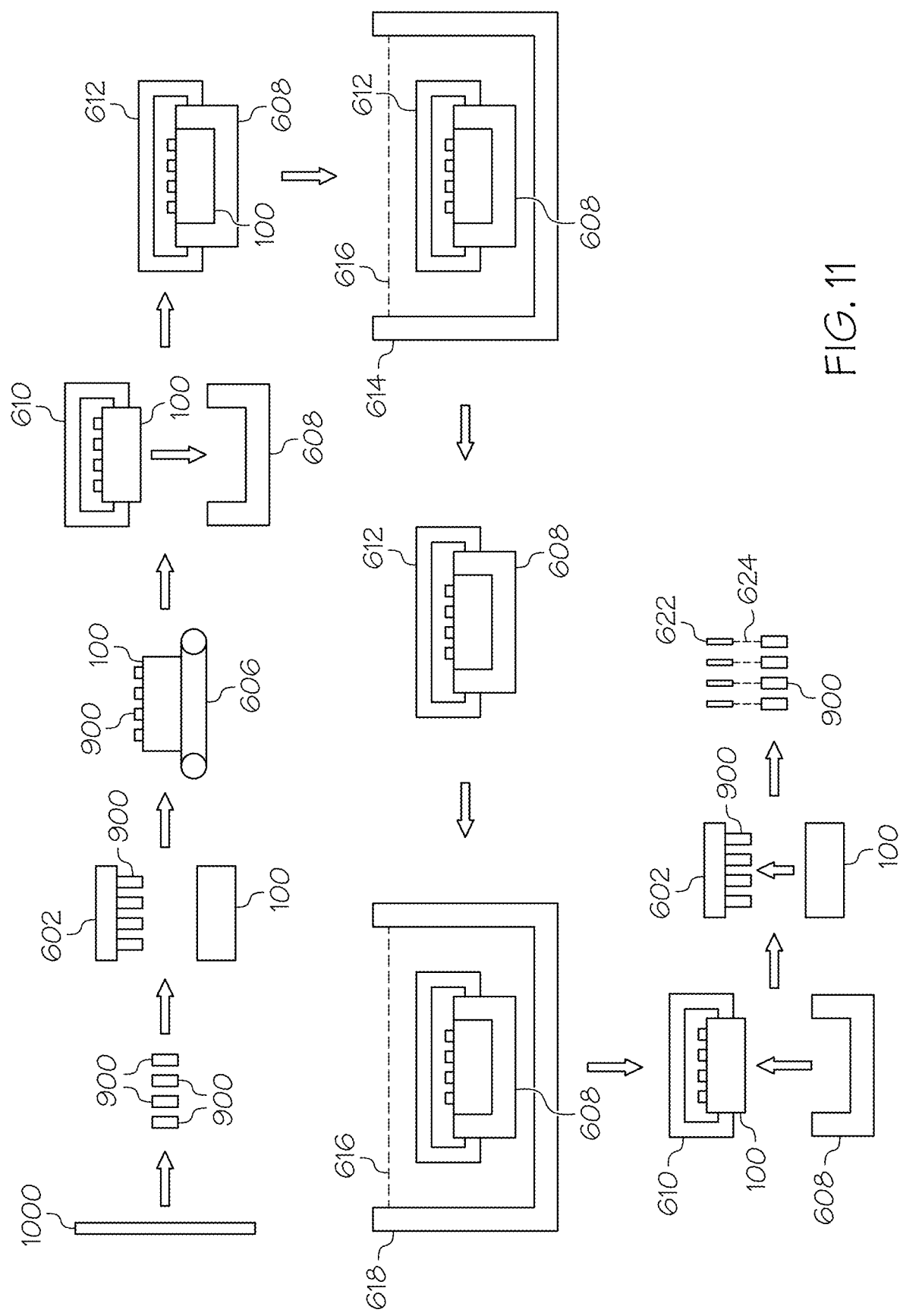
FIG. 11 schematically depicts the process described in the flow diagram of FIG. 10, according to one or more embodiments shown and described herein.

Now referring collectively to FIGS. 1, 2, 10, and 11, the glass articles 900 can be strengthened by ion-exchange while being held in the receiving volumes 220 of magazine apparatuses 100. FIG. 10 contains a process flow diagram 501 of a method for strengthening glass articles 900 by ion-exchange and FIG. 11 schematically depicts the process described in the flow diagram. In a first step 502, glass tube stock 1000 formed from an ion-exchangeable glass composition is initially shaped into glass articles 900 (specifically glass vials in the embodiment depicted) using conventional shaping and forming techniques. In step 504, the glass articles 900 are loaded into magazine apparatuses 100 using a mechanical magazine loader 602. The magazine loader 602 may be a mechanical gripping device, such as a caliper or the like, which is capable of gripping multiple glass articles 900 at one time. Alternatively, the gripping device may utilize a vacuum system to grip the glass articles 900. The magazine loader 602 may be coupled to a robotic arm or other, similar device capable of positioning the magazine loader 602 with respect to the glass articles 900 and the magazine apparatus 100. The magazine loader 602 positions individual glass articles 900 in the receiving volumes 220.

In a next step 506, the magazine apparatus 100 loaded with glass articles 900 is transferred with a mechanical conveyor, such as a conveyor belt 606, overhead crane or the like, to a cassette loading area. Thereafter, in step 508, a plurality of magazine apparatuses 100 (one depicted) are loaded into a cassette 608. While only one magazine apparatus 100 is depicted in FIG. 11, it should be understood that the cassette 608 is constructed to hold a plurality of magazine apparatuses 100, such as depicted in FIG. 9, such that a large number of glass articles 900 can be processed simultaneously. Each magazine apparatus 100 is positioned in the cassette 608 utilizing a cassette loader 610. The cassette loader 610 may be a mechanical gripping device, such as a caliper or the like, which is capable of gripping one or more magazine apparatuses 100 at a time. Alternatively, the gripping device may utilize a vacuum system to grip the magazine apparatuses 100. The cassette loader 610 may be coupled to a robotic arm or other, similar device capable of positioning the cassette loader 610 with respect to the cassette 608 and the magazine apparatuses 100.

In a next step 510, the cassette 608 containing the magazine apparatuses 100 and glass articles 900 is transferred to an ion-exchange station and loaded into an ion-exchange tank 614 to facilitate chemically strengthening the glass articles 900. The cassette 608 is transferred to the ion-exchange station with a cassette transfer device 612. The cassette transfer device 612 may be a mechanical gripping device, such as a caliper or the like, which is capable of gripping the cassette 608. Alternatively, the gripping device may utilize a vacuum system to grip the cassette 608. The cassette transfer device 612 and attached cassette 608 may be automatically conveyed from the cassette loading area to the ion-exchange station with an overhead rail system, such as a gantry crane or the like. Alternatively, the cassette transfer device 612 and attached cassette 608 may be conveyed from the cassette loading area to the ion-exchange station with a robotic arm. In yet another embodiment, the cassette transfer device 612 and attached cassette 608 may be conveyed from the cassette loading area to the ion-exchange station with a conveyor and, thereafter, transferred from the conveyor to the ion-exchange tank 614 with a robotic arm or an overhead crane.

Once the cassette transfer device 612 and attached cassette 608 are at the ion-exchange station, the cassette 608 and the glass articles 900 contained therein may optionally be preheated prior to submerging the cassette 608 and the glass articles 900 in the ion-exchange tank 614. In some embodiments, the cassette 608 may be preheated to a temperature greater than room temperature and less than or equal to the temperature of the molten salt bath in the ion-exchange tank 614. For example, the glass articles 900 may be preheated to a temperature from about 300° C.-500° C. However, it should be understood that the preheating step is optional due to the relatively low thermal mass of the magazine apparatuses 100 described herein.

Without being bound by theory, thermal uniformity of the magazine apparatus 100 and glass articles 900 prior to introduction into the ion-exchange tank may be important to maintaining temperature of the salt bath in the tank. For example, introduction of room temperature vials into hot salt may result in a solidification of salt around the opening of the glass article 900. Additionally, as the Bond number formula suggests, the filling performance also correlates with the ratio of fluid density to surface tension, both of which are temperature sensitive properties. This ratio decreases with temperature, which also may improve filling performance.

The ion-exchange tank 614 contains a bath of molten salt 616, such as a molten alkali salt, such as $KNO_3$, $NaNO_3$ and/or combinations thereof. In one embodiment, the bath of molten salt is 100% molten $KNO_3$ which is maintained at a temperature greater than or equal to about 350° C. and less than or equal to about 500° C. However, it should be understood that baths of molten alkali salt having various other compositions and/or temperatures may also be used to facilitate ion-exchange of the glass articles. In some embodiments, the molten salt 616 should be held at a temperature as high as is possible given process constraints. Without being bound by theory, it is believed that a higher salt bath temperature may reduce the ratio of salt density to viscosity.

In step 512, the glass articles 900 are ion-exchange strengthened in the ion-exchange tank 614. Specifically, the glass articles are submerged in the molten salt and held there for a period of time sufficient to achieve the desired compressive stress and depth of layer in the glass articles 900. As the glass articles 900 are submerged, the glass articles initially have positive buoyancy as air escapes from the interior volume of the glass articles and is replaced with molten salt. As the glass articles 900 rise due to the positive buoyancy, the glass articles are vertically retained in position by the bottom support floor 500, cover plate 400, and glassware-securing members 200.

In one embodiment, the glass articles 900 may be held in the ion-exchange tank 614 for a time period sufficient to achieve a depth of layer of up to about 100 µm with a compressive stress of at least about 300 MPa or even 350 MPa. The holding period may be less than 30 hours or even less than 20 hours. However it should be understood that the time period with which the glass articles are held in the tank 614 may vary depending on the composition of the glass container, the composition of the bath of molten salt 616, the temperature of the bath of molten salt 616, and the desired depth of layer and the desired compressive stress.

Figure 12:
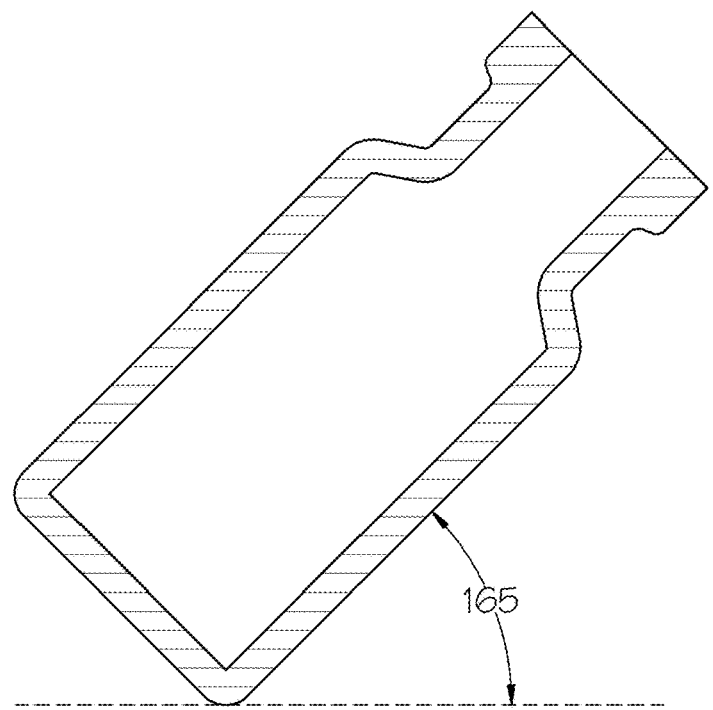
FIG. 12 schematically depicts a glass article at a non-normal angle, according to one or more embodiments shown and described herein.

In one embodiment, the glass articles are dipped into the ion-exchange tank 614 while being held at a non-normal angle relative to the surface of the fluid in the tank (shown as a dashed line in FIG. 12). The non-normal angle is shown as angle 165 in FIG. 12. The orientation of the vial can also affect the reliability of the filling process. Without being bound by theory, it is believed that a vial that is introduced normal to the fluid surface is more likely to form bubbles. This is caused by balancing the bubble buoyancy to the hydrostatic pressure of the fluid. When the glass article 900 is titled, the forces are not aligned, allowing the bubble to escape and the fluid to enter the glass article 900 more reliably with less cavitation. The magazine apparatuses 100 and processes described herein may allow a fixed, non-normal angle to be imparted on the glass articles 900 with respect to the surface of the salt bath during introduction into the salt bath. Futhermore, in some embodiments, glass articles 900 may be moved by buoyancy forces, and these buoyancy forces may partially tip the glass article within the glassware-retaining openings 210 to achieve non-normal angles of the glass articles 900 with respect to the surface of the salt bath during introduction into the salt bath. Such motion caused by buoyancy forces may improve filling efficiency.

Additionally, the speed at which the glass article is submerged can cause changes in the reliability of the filling process. Generally, slower dipping speeds may more reliably fill the glass articles 900. However, it may be possible to utilize higher submersion speeds if the glass article 900 is submerged at a non-normal angle. Referring again to FIG. 12, in some embodiments, the speed of submersion may be increased as angle 165 is decreased. In some embodiments, it may be desirable to submerge the glass article 900 where angle 165 is about 45°, such as from about 40° to about 50° or from about 35° to about 55°. In another embodiment, angle 165 may be about 0°, such that the opening of the glass article is substantially perpendicular to the surface of the ion-exchange bath. For example, angle 165 may be from about −5° to about 5° or from about −10° to about 10°.

After the glass articles 900 are ion-exchange strengthened, the cassette 608 and glass articles 900 are removed from the ion-exchange tank 614 using the cassette transfer device 612 in conjunction with a robotic arm or overhead crane. During removal from the ion-exchange tank 614, the various fluid passages of the magazine apparatus 100 allow the molten salt within the magazine apparatus to readily drain from each magazine apparatus 100. After the cassette 608 is removed from the ion-exchange tank 614, the cassette 608 and the glass articles 900 are suspended over the ion-exchange tank 614 and the cassette 608 is rotated about a horizontal axis such that any molten salt remaining in the glass articles 900 is emptied back into the ion-exchange tank 614. As the cassette 608 is rotated, the glass articles 900 are maintained in its position in the receiving volume 220. Thereafter, the cassette 608 is rotated back to its initial position and the glass articles are allowed to cool prior to being rinsed.

The cassette 608 and glass articles 900 are then transferred to a rinse station with the cassette transfer device 612. This transfer may be performed with a robotic arm or overhead crane, as described above, or alternatively, with an automatic conveyor such as a conveyor belt or the like. In a next step 514, the cassette 608 and glass articles 900 are lowered into a rinse tank 618 containing a water bath 620 to remove any excess salt from the surfaces of the glass articles 900. The cassette 608 and glass articles 900 may be lowered into the rinse tank 618 with a robotic arm, overhead crane or similar device which couples to the cassette transfer device 612. Similar to the salt bath submersion, the glass articles initially have a positive buoyancy upon being submerged in the rinse tank 618. As the glass articles 900 rise due to the positive buoyancy, the glass articles are vertically retained in position. The glass articles 900 may be dipped at a non-normal angle relative to the surface of the water bath, as discussed with regards to dipping into the salt bath.

The cassette 608 and glass articles 900 are then withdrawn from the rinse tank 618, suspended over the rinse tank 618, and the cassette 608 is rotated about a horizontal axis such that any rinse water remaining in the glass articles 900 is emptied back into the rinse tank 618. As the cassette 608 is rotated, the glass articles 900 are maintained in their position in the receiving volume 220. In some embodiments, the rinsing operation may be performed multiple times before the cassette 608 and glass articles 900 are moved to the next processing station.

In one particular embodiment, the cassette 608 and the glass articles 900 are dipped in a water bath at least twice. For example, the cassette 608 may be dipped in a first water bath and, subsequently, a second, different water bath to ensure that all residual alkali salts are removed from the surface of the glass article. The water from the first water bath may be sent to waste water treatment or to an evaporator.

In a next step 516, the magazine apparatuses 100 are removed from the cassette 608 with the cassette loader 610. Thereafter, in step 518, the glass articles 900 are unloaded from the magazine apparatuses 100 with the magazine loader 602 and transferred to a washing station. In step 520, the glass articles are washed with a jet of de-ionized water 624 emitted from a nozzle 622. The jet of de-ionized water 624 may be mixed with compressed air.

Optionally, in step 521 (not depicted in FIG. 10), the glass articles 900 are transferred to an inspection station where the glass articles are inspected for flaws, debris, discoloration and the like.

While the magazine apparatuses have been shown and described herein being used in conjunction with glass containers, such as glass vials, it should be understood that the magazine apparatuses may be used to hold and retain various other types of glass articles including, without limitation, Vacutainers®, cartridges, syringes, ampoules, bottles, flasks, phials, tubes, beakers, vials or the like, including both round-form glass articles and non-round-form glass articles.

It should now be understood that the magazine apparatuses and methods described herein may be used to hold and retain glass articles during processing. The magazine apparatuses restrict movement of the glass articles while allowing for ion-exchange processing by contact with molten salt baths.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

EXAMPLES

The embodiments described herein will be further clarified by the following examples.

Example 1

Different patterns of cover plates were examined for their impact on vial filling, including a diagonal crisscrossing geometry, sometimes referred to herein as a "preform" geometry (as shown in FIG. 6), a wire mesh geometry (as shown in FIG. 8), and a machined plate with holes specifically matched to each vial (the embodiment of FIGS. 2 and 3 where the hole is larger than the glass article opening). Table 1 shows results of filling tests conducted with preform, wire mesh, and machined hole geometries. For each test, 162 glass vials were submerged and evaluated for whether they filled with fluid.

TABLE 1

| Test Number | Cover Plate Geometry | Fill % |
| --- | --- | --- |
| 1 | Preform | 90.1% |
| 2 | Wire Mesh | 92.0% |
| 3 | Preform | 71.0% |
| 4 | Wire Mesh | 84.0% |
| 5 | Preform | 68.5% |
| 6 | Wire Mesh | 79.6% |
| 7 | Preform | 56.8% |
| 8 | Wire Mesh | 95.1% |
| 9 | Preform | 96.8% |
| 10 | Machined holes | 100.0% |
| 11 | Machined holes | 99.3% |
| 12 | Machined holes | 100.0% |
| 13 | Machined holes | 100.0% |
| 14 | Machined holes | 100.0% |
| 15 | Machined holes | 100.0% |
| 16 | Machined holes | 100.0% |

The average fill rate for the preform geometry was 71.6%, 87.7% for the wire mesh geometry, and 99.9% for machined holes.

Example 2

Figure 13:
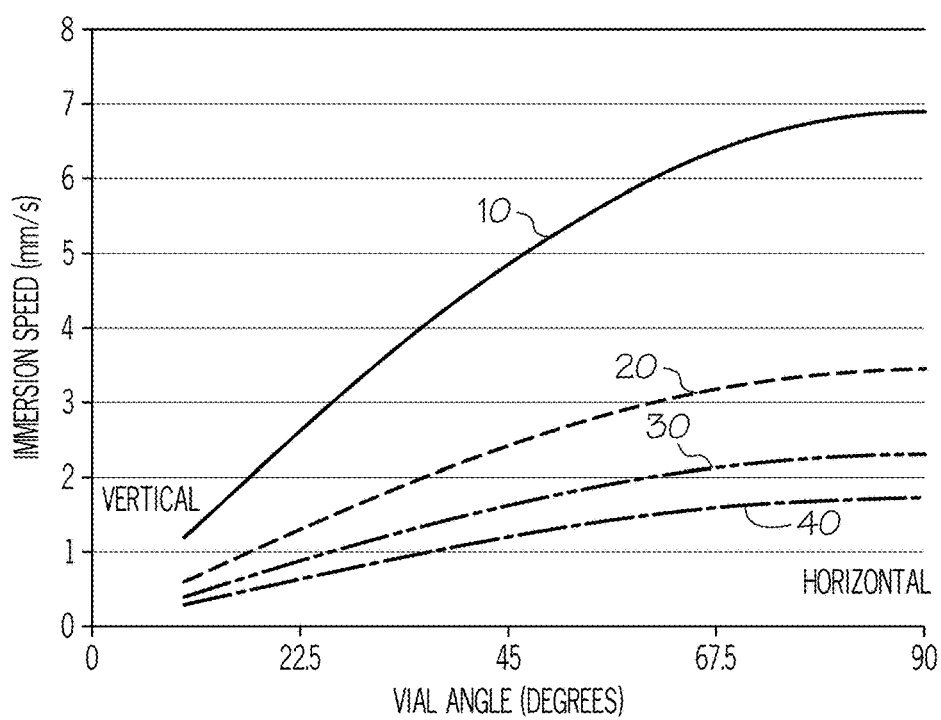
FIG. 13 shows test data for vial filling, according to one or more embodiments shown and described herein.

Calculation were made to model glass vials dipped at varying immersion speeds and at varying angles into a fluid. FIG. 13 depicts the calculated vial filling time at varying immersion speeds and angles of entry. Line 10 represents filling in 1 second, line 20 represents filling in 2 seconds, line 30 represents filling in 3 seconds, and line 40 represents filling in 4 seconds. The filling time is the time it took to completely fill the vial (without the presence of bubbles). The y-axis represents the immersion speed and the x-axis represents the vial angle, marked 165 in FIG. 12. As reflected in FIG. 13, higher immersion speeds require greater angles relative to the processing fluid surface.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for ion-exchanging glass articles, the method comprising:
   supplying an apparatus for holding and retaining glass articles during processing, the apparatus defining a plurality of receiving volumes for holding glass articles and comprising:
   a bottom support floor comprising a plurality of fluid passages;
   a glassware-securing member positioned above the bottom support floor and comprising a plurality of glassware-retaining openings; and a cover plate positioned above the glassware-securing member and comprising a plurality of fluid passages;
wherein:
each of the bottom support floor, the glassware-securing member, and the cover plate is substantially planar;
the bottom support floor, the glassware-securing member, and the cover plate are substantially parallel with one another;
each glassware-retaining opening of the glassware-securing member defines a width dimension of the receiving volume; and
the bottom support floor and the cover plate define a height dimension of the receiving volume;
positioning one or more glass articles in one or more of the receiving volumes; and
at least partially submerging the apparatus in an ion-exchange bath to contact the one or more glass articles with the ion-exchange bath.

2. The method of claim 1, wherein the glass article is submerged in the ion-exchange bath at a non-normal angle relative to the surface of the ion-exchange bath.

3. The method of claim 1, wherein the apparatus further comprises vertical supports that securely connect the bottom support floor, the glassware-securing member, and the cover plate.

4. The method of claim 1, wherein the apparatus further comprises a second glassware-securing member positioned between the bottom support floor and the cover plate.

5. The method of claim 1, wherein the glassware-retaining openings of the glassware-securing member are circularly shaped.

6. The method of claim 1, wherein one or more of the fluid passages of the cover plate are aligned with a glassware-retaining opening.

7. The method of claim 1, wherein one or more of the fluid passages of the cover plate are circularly shaped.

8. The method of claim 1, wherein:
one or more of the fluid passages of the cover plate are aligned with a glassware-retaining opening;
one or more of the fluid passages of the cover plate are circularly shaped; and
a diameter of each fluid passage that is circularly shaped and aligned with a glassware-retaining opening is less than a diameter of glassware-retaining opening with which it is aligned.

9. The method of claim 1, wherein the cover plate and the bottom support floor are substantially identical.

10. The method of claim 1, wherein the bottom support floor comprises a wire mesh.

11. A method for ion-exchanging glass articles, the method comprising:
supplying an assembly comprising a plurality of magazine apparatuses, wherein one or more of the magazine apparatuses defines a plurality of receiving volumes and comprises:
a bottom support floor comprising a plurality of fluid passages;
a glassware-securing member positioned above the bottom support floor and comprising a plurality of glassware-retaining openings; and
a cover plate positioned above the glassware-securing member and comprising a plurality of fluid passages;
wherein:
each of the bottom support floor, the glassware-securing member, and the cover plate is substantially planar;
the bottom support floor, the glassware-securing member, and the cover plate are substantially parallel with one another;
each glassware-retaining opening of the glassware-securing member defines a width dimension of the receiving volume; and
the bottom support floor and the cover plate define a height dimension of the receiving volume;
positioning one or more glass articles in one or more of the receiving volumes; and
at least partially submerging the assembly in an ion-exchange bath to contact the one or more glass articles with the ion-exchange bath.

12. The method of claim 11, wherein at least one of the magazine apparatuses do not comprise a cover plate.

13. The method of claim 11, wherein for at least one magazine apparatus the height dimension of the receiving volume is defined by the bottom support floor of a lower magazine apparatus and a bottom support floor of an upper magazine apparatus, wherein the upper magazine apparatus and the lower magazine apparatus are stacked on one another and are adjacent to one another.

14. The method of claim 11, where one or more of the magazine apparatuses further comprises vertical supports that securely connect the bottom support floor, the glassware-securing member, and the cover plate.

15. The method of claim 11, where one or more of the magazine apparatuses further comprises a second glassware-securing member positioned between the bottom support floor and the cover plate.

16. The method of claim 11, wherein the glassware-retaining openings of the glassware-securing member are circularly shaped.

17. The method of claim 11, wherein one or more of the fluid passages of the cover plate are aligned with a glassware-retaining opening.

18. The method of claim 11, wherein one or more of the fluid passages of the cover plate are circularly shaped.

19. The method of claim 11, wherein:
one or more of the fluid passages of the cover plate are aligned with a glassware-retaining opening;
one or more of the fluid passages of the cover plate are circularly shaped; and
a diameter of each fluid passage that is circularly shaped and aligned with a glassware-retaining opening is less than a diameter of glassware-retaining opening with which it is aligned.

20. The method of claim 11, wherein the cover plate and the bottom support floor are substantially identical.

* * * * *